(12) United States Patent
Chu et al.

(10) Patent No.: US 12,120,760 B2
(45) Date of Patent: Oct. 15, 2024

(54) MULTI-LINK DEVICE (MLD) SETUP AND MULTI-LINK OPERATION (MLO)

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 291 days.

(21) Appl. No.: 17/452,061

(22) Filed: Oct. 23, 2021

(65) Prior Publication Data

US 2022/0132608 A1    Apr. 28, 2022

Related U.S. Application Data

(60) Provisional application No. 63/104,711, filed on Oct. 23, 2020.

(51) Int. Cl.
| | |
|---|---|
| *H04L 1/00* | (2006.01) |
| *H04B 7/08* | (2006.01) |
| *H04W 76/15* | (2018.01) |
| *H04W 84/12* | (2009.01) |

(52) U.S. Cl.
CPC ............ *H04W 76/15* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 11,324,046 | B2 * | 5/2022 | Jang | H04L 1/0068 |
| 11,382,158 | B2 * | 7/2022 | Zhang | H04W 76/15 |
| 11,540,200 | B2 * | 12/2022 | Chu | H04L 45/24 |
| 11,595,884 | B2 * | 2/2023 | Seok | H04W 48/16 |
| 11,596,021 | B2 * | 2/2023 | Cariou | H04W 48/12 |
| 11,743,709 | B2 * | 8/2023 | Patil | H04W 76/15 |
| 2021/0120586 | A1 * | 4/2021 | Cariou | H04W 84/12 |
| 2022/0286194 | A1 * | 9/2022 | Huang | H04W 76/15 |
| 2023/0119901 | A1 * | 4/2023 | Viger | H04W 76/15 370/329 |
| 2023/0148056 | A1 * | 5/2023 | Guo | H04W 24/02 370/252 |
| 2023/0164859 | A1 * | 5/2023 | Jang | H04L 69/14 370/328 |
| 2023/0209536 | A1 * | 6/2023 | Guo | H04W 72/20 370/329 |

(Continued)

OTHER PUBLICATIONS

"IEEE P802.11-15 Wireless LANS Proposed Spec Text—Usage and Rules of ML Element in the Context of Multi-link Setup"; retrieved from the internet Oct. 20, 2021 https://mentor.ieee.org/802.11/dcn/20/11-20-1300-01-00be-pdt-mac-mlo-multi-link-setup-usage-and-rules-of-ml-ie.docx; 3 pages (Sep. 1, 2020).

(Continued)

*Primary Examiner* — Sithu Ko (57) ABSTRACT

One example discloses a multi-link device (MLD) within a wireless local area network (WLAN), including: a controller configured to generate a management frame having a set of multi-link information elements (ML IEs); wherein the MLD is configured to be coupled to a set of PHY-layer links; and wherein the controller is configured to perform a multi-link setup with a second MLD using the set of ML IEs over the PHY-layer links.

11 Claims, 6 Drawing Sheets

(56) References Cited

U.S. PATENT DOCUMENTS

| | | | |
|---|---|---|---|
| 2023/0217271 A1* | 7/2023 | Kim | H04W 24/02 370/329 |
| 2023/0269804 A1* | 8/2023 | Kishida | H04W 76/15 370/311 |

OTHER PUBLICATIONS

"IEEE Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications, Section 9.4.2.199 TWT Element"; 156 pages (2021).

"IEEE Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications, Section 9.4.2.18 Channel Switch Announcement Element, Includes Table of Contents"; 150 pages (2021).

IEEE Standard for Information Technology—Telecommunications and Information Exchange between Systems Local and Metropolitan Area Networks—Specific Requirements"—9.4.2.247 Anti-Clogging Token Container element"; 149 pages (2020).

Jang, Insun et al; "IEEE P802.11 Wireless LANs, Proposed Spec Text—TBD, Usage and Rules of ML Element in the Context of Multi-link Setup"; 2 pages (Jan. 2021).

Khorov, Evgeny et al; IEEE Access; Current Status and Directions of IEEE 802.11be, the Future Wi-Fi 7; retrieved from the Internet https://ieeexplore.ieee.org/document/9090146/keywords#keywords Oct. 20, 2021; 25 pages (May 21, 2020).

O'Hara, Bob; "IEEE P802.11 Wireless LANs, Addition of a Vendor-specific Information Element"; 2 pages (May 10, 2004).

* cited by examiner

MULTI-LINK DEVICE (MLD) SETUP AND MULTI-LINK OPERATION (MLO)

REFERENCE TO PROVISIONAL APPLICATION TO CLAIM PRIORITY

A priority date for this present U.S. patent application has been established by prior U.S. Provisional Patent Application Ser. No. 63/104,711, entitled "MLO cross-link information transmission", filed on Oct. 23, 2020, and commonly assigned to NXP USA, Inc.

The present specification relates to systems, methods, apparatuses, devices, articles of manufacture and instructions for Multi-link setup and operation between a set of Multi-Link Devices (MLDs).

SUMMARY

According to an example embodiment, a multi-link device (MLD) within a wireless local area network (WLAN), comprising: a controller configured to generate a management frame having a set of multi-link information elements (ML IEs); wherein the MLD is configured to be coupled to a set of PHY-layer links; and wherein the controller is configured to perform a multi-link setup with a second MLD using the set of ML IEs over the PHY-layer links.

In another example embodiment, the controller is configured to carry the set of ML IEs over just one of the PHY-layer links.

In another example embodiment, the ML IEs include multi-link control; and the multi-link control includes at least one of: an MLSR indication, an ESRMR indication, an ESRMR MCS Nss Present, a low latency support, a low latency link ID, and/or a ML max MPDU length.

In another example embodiment, the MLD is a station (STA); and the ML IEs include a per-STA-profile and a set of per-STA control elements.

In another example embodiment, the ML IEs include a set of common IEs and a set of link IEs.

In another example embodiment, the common fields include multi-link control.

In another example embodiment, the common fields also include a set of low latency link ID(s).

In another example embodiment, the link IEs include a set of per-STA-profiles.

In another example embodiment, the per-STA-profiles include a set of low latency link ID(s).

In another example embodiment, the management frame is at least one of: a beacon frame, a probe request frame, a probe response frame, an association request frame, an association response frame, a reassociation request frame, or a reassociation response frame.

In another example embodiment, the set of ML IEs generated by the controller are different for different management frame types.

In another example embodiment, the second MLD is a STA (station) and the first MLD is an AP (access point).

In another example embodiment, both MLDs are STAs (stations).

According to an example embodiment, a method for multi-link setup between a first Multi-Link Device (MLD) and a second Multi-Link Device (MLD), comprising: receiving a request frame from the first MLD for multi-link setup with the second MLD; wherein multi-link setup is defined by a set of multi-link information elements (ML IEs); and transmitting a response frame, that includes at least one of the ML IEs, from the second MLD to the first MLD.

In another example embodiment, receiving a second request frame from the first MLD for multi-link setup with the second MLD; and transmitting a second response frame, that includes an additional set of ML IEs, from the second MLD to the first MLD.

In another example embodiment, receiving a second request frame from the first MLD for multi-link setup with a third MLD; wherein multi-link setup is defined by a second set of ML IEs.

In another example embodiment, transmitting a second response frame from the second MLD to the first MLD that includes at least one ML IE in the second set of ML IEs.

In another example embodiment, transmitting a third response frame from the second MLD directly to the third MLD that includes the at least one ML IE in the second set of ML IEs.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

IEEE (Institute of Electrical and Electronics Engineers) 802 defines communications standards for various networked devices (e.g. Local Area Networks (LAN), Metropolitan Area Networks (MAN), etc.). IEEE 802.11 further defines communications standards for Wireless Local Area Networks (WLAN). As such, communications on these networks must, by agreement, follow one or more communications protocols so that various network devices can communicate. These protocols are not static and are modified (e.g. different generations) over time, typically to improve communications robustness and increase throughput.

In embodiments of a wireless communication network described below, a wireless communications device such as an access point (AP) of a wireless local area network (WLAN) transmits data streams to one or more client stations (STAs). The AP and STAs communicate using one or more communication protocols. These protocols may include IEEE protocols such as: 802.11b; 802.11g; 802.11a; 802.11n [i.e. HT (High Throughput) with Single-User Multiple-Input Multiple-Output (SU-MIMO)]; 802.11ac [i.e. VHT (Very High Throughput) with downlink Multi-User MIMO (MU-MIMO)]; 802.11ax [i.e. HE (High Efficiency) operating at both 2.4- and 5-GHz bands, including OFDMA (Orthogonal Frequency Division Multiple Access) and MU-MIMO with uplink scheduling]; and 802.11be [i.e. EHT (Extra High Throughput) operating at 2.4 GHz, 5 GHz, and 6 GHz frequency bands and a much wider 320 MHz bandwidth]. In various example embodiments, one or more APs may be affiliated into a logical AP group and/or one or more STAs may be affiliated into a logical STA group.

Figure 1:
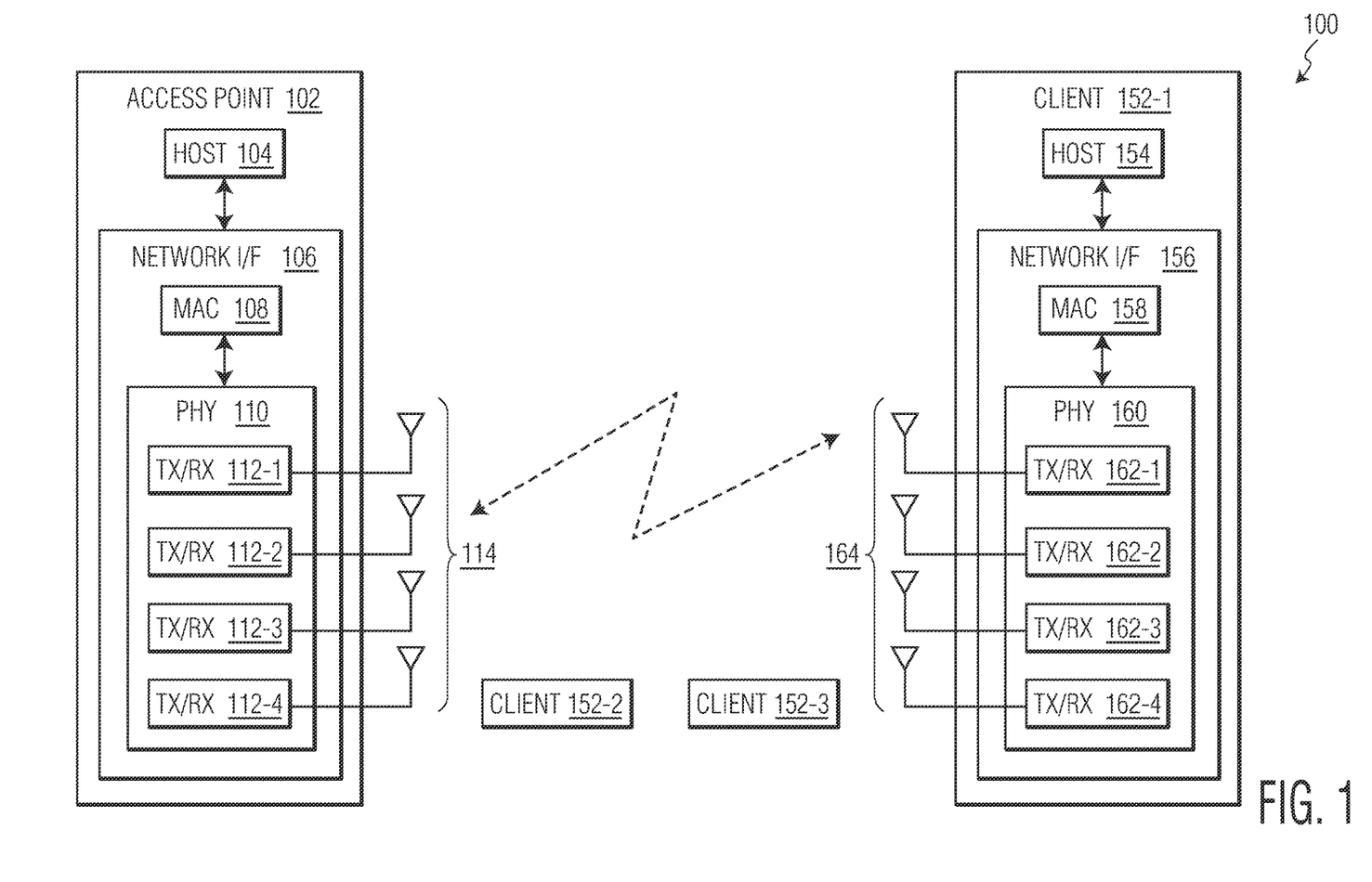
FIG. 1 represents an example wireless communications network (WLAN) formed by a set of wireless communications devices (i.e. APs and STAs).

FIG. 1 represents an example 100 wireless communications network (WLAN) formed by a set of wireless communications devices (i.e. APs and STAs). The WLAN 100 includes access point (AP) 102 and a set of client stations (STAs) 152-1, 152-2, and 152-3.

The AP 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device.

Network interface 106 includes medium access control (MAC) processor/controller 108 and physical layer (PHY) processor/controller 110. In some example embodiments the MAC processor 108 operates at the data-link layer of the OSI (Open Systems Interconnection) model and the PHY processor 110 operates at the physical layer of the OSI model.

The PHY processor 110 includes a plurality of transceivers 112-1, 112-2, 112-3, and 112-4, each of which is coupled to a corresponding antenna of antennas 114. These antennas 114 can support MIMO functionality. Each of transceivers 112-1, 112-2, 112-3, and 112-4 includes a transmitter signal path and a receiver signal path, e.g., mixed-signal circuits, analog circuits, and digital signal processing circuits for implementing radio frequency and digital baseband functionality. The PHY processor 110 may also include an amplifier (e.g., low noise amplifier or power amplifier), a data converter, and circuits that perform discrete Fourier transform (DFT), inverse discrete Fourier transform (IDFT), modulation, and demodulation, thereby supporting OFDMA modulation.

The client STAs 152-1, 152-2, and 152-3 each include similar circuits (e.g., host processor 154, network interface 156, MAC processor 158, PHY processor 160, transceivers 162-1, 162-2, 162-3, and 162-4, and antennas 164) that provide similar functionality to that of AP 102 but are adapted to client-side specifications.

The MAC 108, 158 and PHY 110, 160 processors within the AP 102 and STA 152-1 exchange PDUs (Protocol Data Units) and SDUs (Service Data Units) in the course of managing the wireless communications traffic. The PHY processor is configured to receive MAC layer SDUs.

While 802.11-baseline Probe Requests/Responses have been used for communication between various APs and STAs, and such devices can use several links simultaneously, these links are independent, which limits their efficiency.

Now discussed are various fields and rules for multi-link setup and operation, which increase data rates and reduce latency. Multi-link operation allows for efficient use of the channel resources and does not suffer from interference in dense deployments. Discussed herein are example embodiments for efficient multi-link setup that reduce a total set of channel state information (i.e. reduce overhead) that would otherwise need to be exchanged to setup multiple links. A set of multi-link information elements (ML IEs) are herein introduced for inclusion in various management frames which can reduce such overhead.

Figure 2:
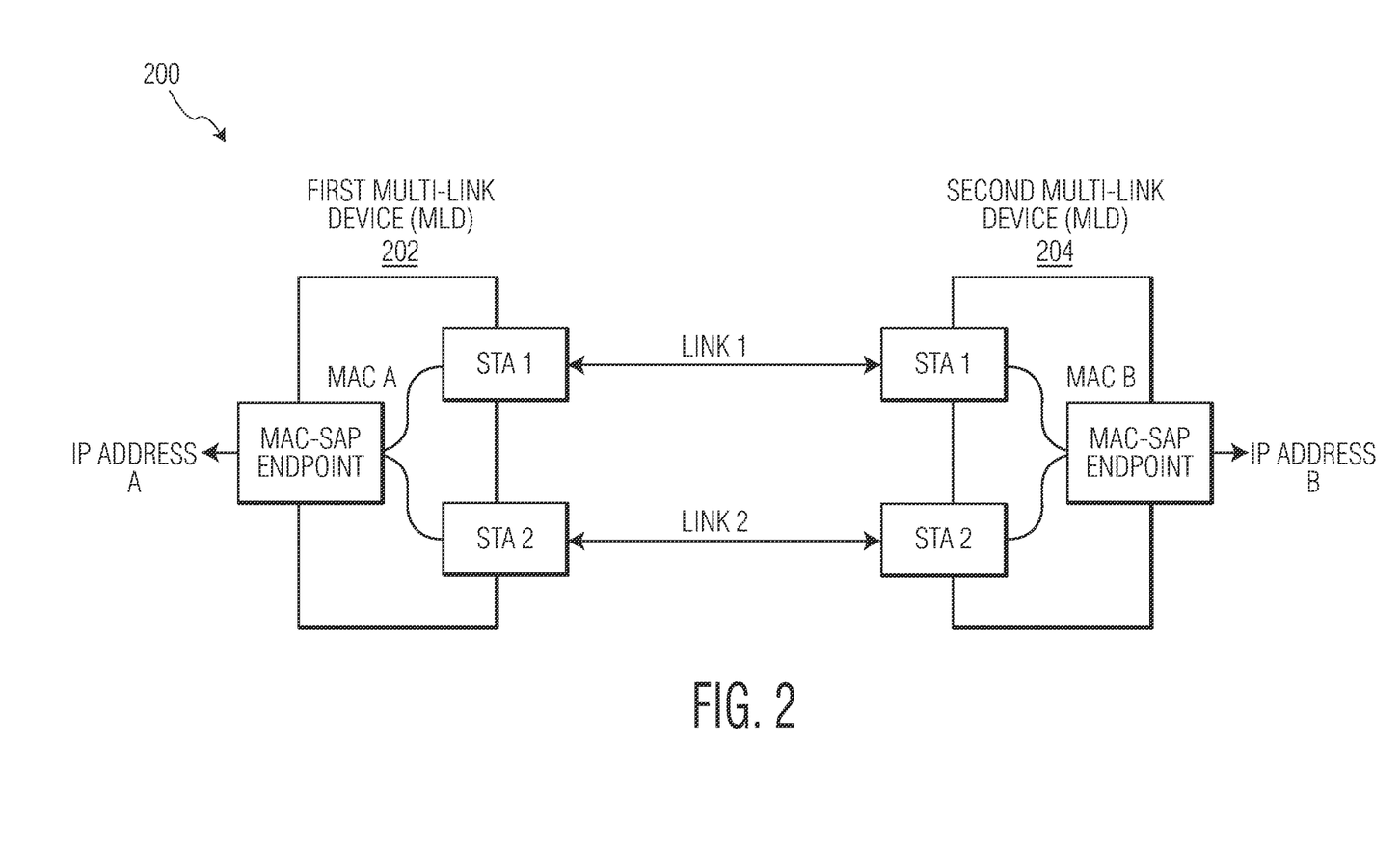
FIG. 2 represents an example topology between a set of multi-link devices.

FIG. 2 represents an example 200 topology between a set of multi-link devices (MLDs). The example 200 includes a first multi-link device (MLD) 202 and a second multi-link device (MLD) 204 coupled by a PHY-layer set of links.

The first MLD 202 includes a first affiliated station (STA 1) and a second affiliated station (STA 2). Each affiliated STA includes a separate PHY-layer interface to the wireless media (i.e. Link 1 and Link 2). The affiliated STAs share a single interface to a LLC-layer and thus share a single MAC address (IP address A).

Similarly, the second MLD 204 includes a first affiliated station (STA 1) and a second affiliated station (STA 2). Each affiliated STA includes a separate PHY-layer interface to the wireless media (i.e. Link 1 and Link 2). The affiliated STAs share a single interface to a LLC-layer and thus share a single MAC address (IP address B).

Upper-layer protocols thus consider these sets of affiliated STAs as a single MLD. In other example embodiments the first MLD 202 and/or the second MLD 204 can be affiliated APs (Access Points).

Figure 3:
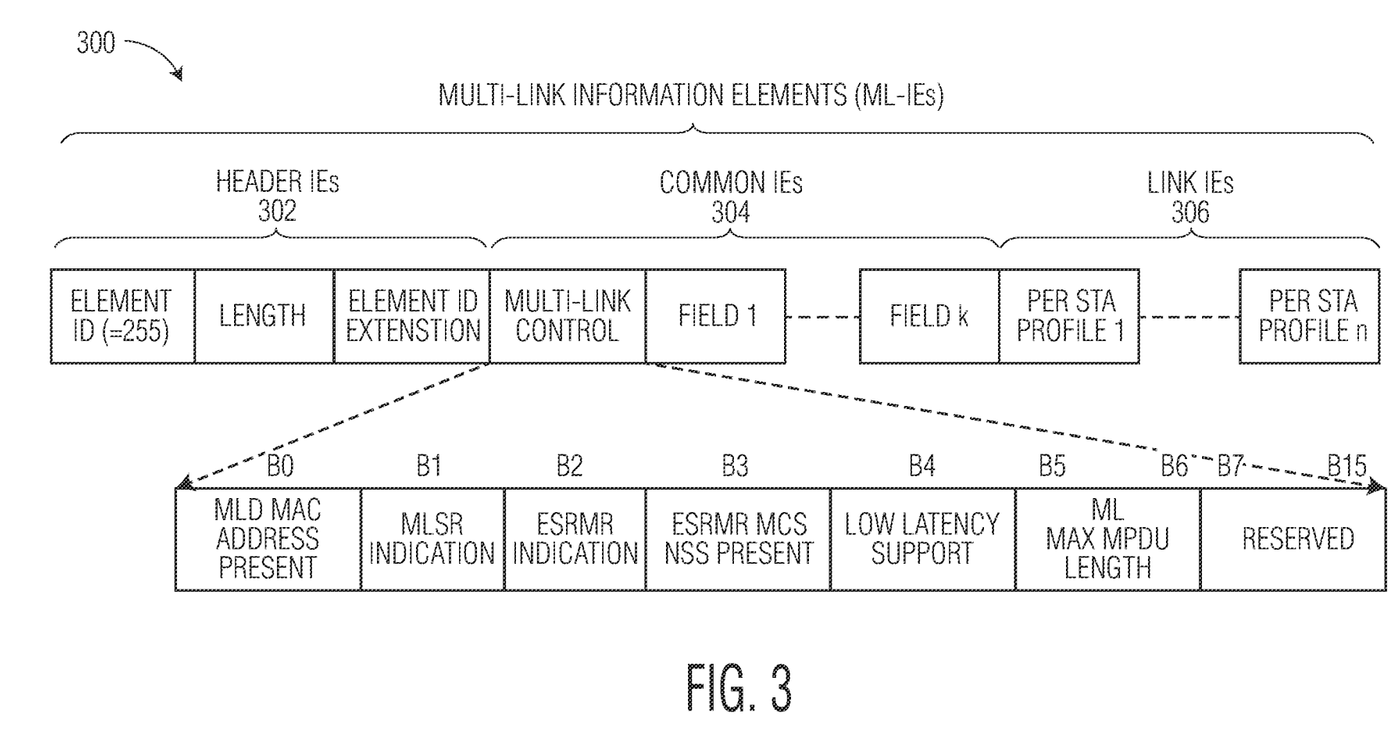
FIG. 3 represents an example first set of Multi-Link (ML) Information Elements (IEs).

FIG. 3 represents an example 300 first set of Multi-Link (ML) Information Elements (IEs). The example 300 first set of ML IEs include: as set of header IEs 302, a set of common IEs 304, and a set of link IEs 306. These ML IEs 300 enable MLD setup and operation between sets of devices such as APs and STAs.

The ML IEs 300 are included in one or more WLAN management frames, such as in a Beacon frame, a Probe Request frame, a Probe Response frame, an Association Request frame, an Association Response frame, a Reassociation Request frame, and/or a Reassociation Response frame. Rules for MLD setup and operation using the ML IEs are also discussed throughout.

The common IEs 304 include a multi-link control IE and a set of fields (1 through k). The multi-link control IE includes the following subelements:

a MAC Address Present for affiliated MLDs.

an MLSR Indication announces whether the MLD supports multi-link single radio operation. A MLD with multiple links and with MLSR Indication being set to not MLSR is multi-link multi radio MLD.

an ESRMR Indication announces whether the MLD supports enhanced MLSR or enhanced MLMR operation. Another option is that ESRMR Nss (Number of Spatial Streams) field indicates the maximal Nss at <=80 MHz. The Nss value that is different from the maximal Nss with a combination of MCS+BW are acquired per (ESRMR Nss)/(maximal Nss of normal operation at <=80 MHz)*Nss value of normal operation with the combination of MCS+BW. When multiple links with ESRMR support <=80 MHz and/or the combination of MCS+BW, the related value is the average of all the links. (see next slide for the example).

an ESRMR MCS Nss Present indicates whether the MCS Nss Capability field is present in Common Info. Another option is that ESRMR MCS Nss is announced in per-STA Profile.

Low Latency Support announces whether the MLD (one STA/AP of the MLD) supports the low latency. Another option is that Low Latency Support announces the number of links that support low latency service.

an ML Max MPDU Length announces the maximal MPDU length in octets (same as the related definition of 11ac).

an ESRMR MCS Nss Support, not shown but placed in one of the Reserved fields. The format is same as EHT MCS Nss Support. The ESRMR MCS Nss Support and the BW supported by a link that supports ESR operation decide the MCS, Nss used in the link under ESR operation. Thus the ESRMR MCS Nss Support is announced in each link that supports EMLSR or EMLMR operation. The eMLMR MCS Nss set of each link can be different and the supported eMLMR MCS Nss set of a link is announced in per link profile of the link. The eMLMR MCS Nss set of each link has same format as the EHT MCS Nss set of the link under MLMR mode.

In some example embodiments the ESRMR MCS Nss field indicates a maximal Nss at <=80 MHz. The Nss value that is different from the maximal Nss with a combination of MCS+BW are acquired per (ESRMR Nss)/(maximal Nss of normal operation at <=80 MHz)*Nss value of normal operation with the combination of MCS+BW.

When multiple links with ESRMR support <=80 MHz and/or the combination of MCS+BW, the related value is the average of all the links. For example, if link 1 (with Nss1 at MCS 13 and 160 MHz, with maximal value Nss801 at 80 MHz) and link 2 (with Nss2 at MCS 13 and 160 MHz, with maximal value Nss802 at 80 MHz) support EMLMR operation.

In some examples, the maximal Nss of EMLMR at <=80 MHz is EMRNss. The Nss of EMLMR at 160 MHz+MCS13 is floor ({EMRNss/[(Nss801+Nss802)/2]} *(Nss1+Nss2)/2) or ceil ({EMRNss/[(Nss801+Nss802)/2]} *(Nss1+Nss2)/2). In other examples, the maximal Nss of EMLMR at <=80 MHz is EMRNss. The Nss of EMLMR at 160 MHz+MCS13 is floor ([EMRNss/Nss801] *Nss1) or ceil ([EMRNss/Nss801] *Nss1). The ESRMR MCS Nss Support field is present when ESRMR MCS Nss Present is equal to 1.

Figure 4:
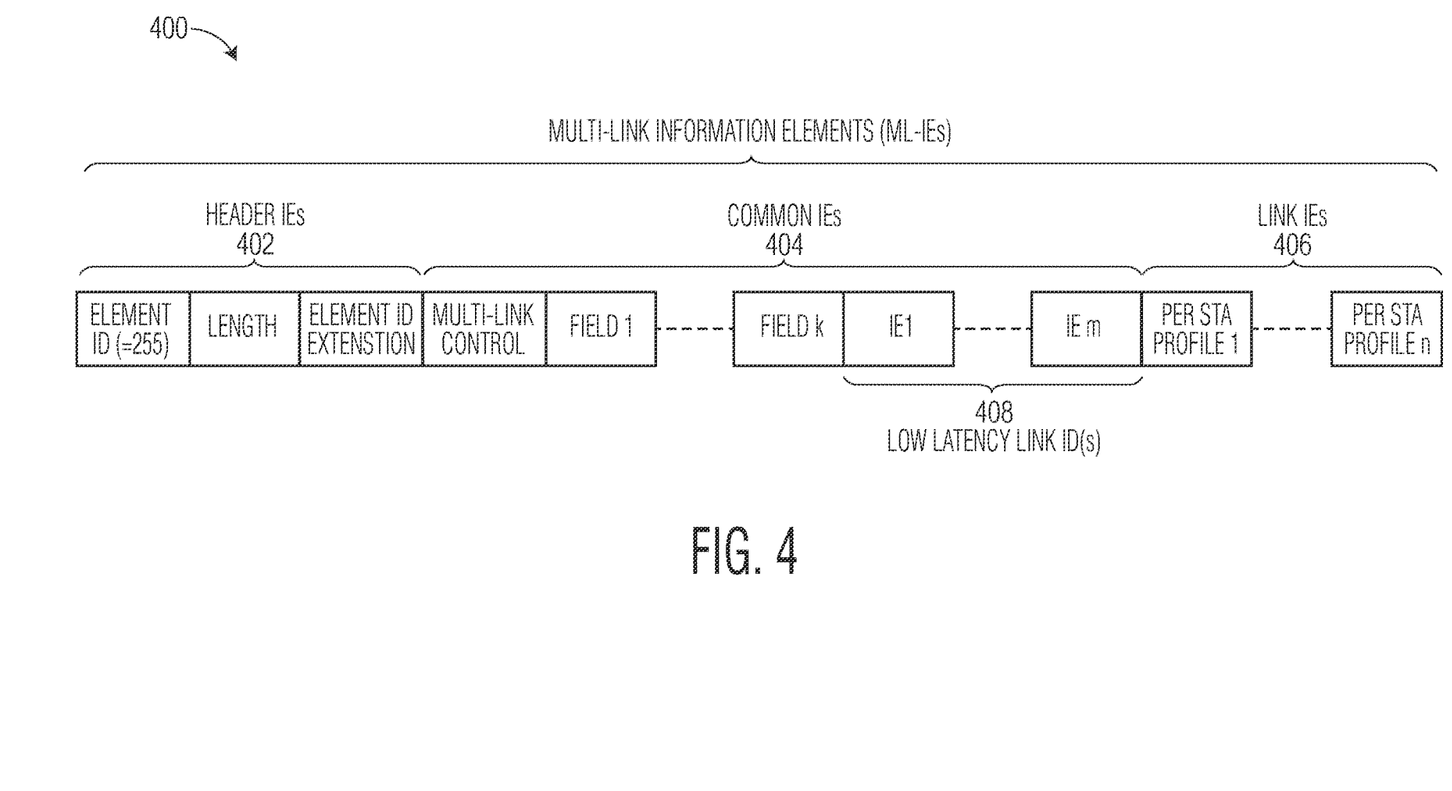
FIG. 4 represents an example second set of ML IEs.

FIG. 4 represents an example 400 second set of ML IEs. The example 400 second set of ML IEs include: a set of header fields 402, a set of common fields and IEs 404, and a set of link IEs 406. The set of common IEs 404 include: a multi-link control, a set of fields (1 through k), and a set of low latency link ID(s) 408.

The set of low latency link ID(s) 408 identify a latency for each of multiple PHY-layer links between a set of affiliated MLDs (e.g. such as those announced in a per-STA Profile shown within the set of link IEs 406.

Figure 5:
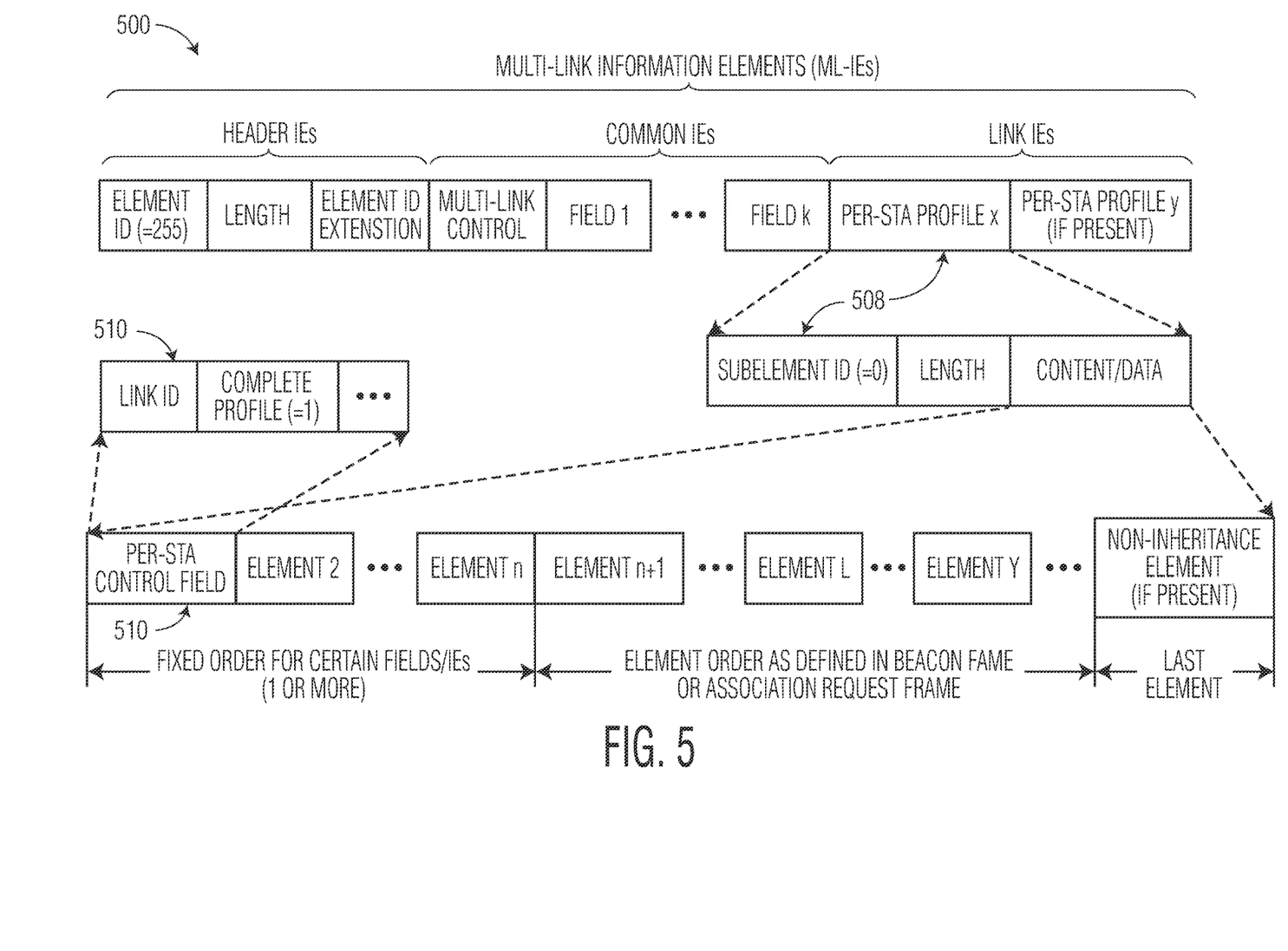
FIG. 5 represents an example third set of ML IEs.

FIG. 5 represents an example 500 third set of ML IEs. The example 500 third set of ML IEs include: a set of header IEs 502, a set of common IEs 504, and a set of link IEs 506. The set of link IEs 506 include a set of per-STA-profiles.

An example per-STA-profile 508 includes a per-STA control field 510.

The per-STA control field includes a link ID and a complete profile for a specific link In additional to per-STA Control field 510, the fields in per-STA-profile carry various fields and elements that are different for different management frames.

For example, in Beacon frame, Beacon Interval and Capability Information are frame dependent fields. However if all affiliated APs in an AP MLD have a same Beacon Interval, then in various example embodiments a Beacon Interval field is not needed in the per-STA Profile.

However n a request frame, no additional fields exist (only per-STA Control 510 is carried). A variant is that the change sequence is frame dependent field for requesting the critical update. Another variant is that in per-STA Control, one-bit indication indicates whether an AP's critical update in the link with the Link ID is requested.

In a response frame, Beacon Interval and Capability Information are frame dependent fields, whereas in the request frame, Capability Information is frame dependent field.

In a reassociation request frame, Capability Information, Listen Interval are frame dependent fields. Current AP Address is not needed in per-STA Profile.

In a reassociation response frame, Capability Information is frame dependent field.

In additional to per-STA Control field, the fields in the per-STA-profile carry the following fields. In a first example the per-STA-profile carries: a Beacon Interval, Capability Information, and a Listen Interval. In per-STA Control, one-bit indication indicates whether the AP's critical update in the link with the Link ID is requested. In a second example the per-STA-profile carries: a Beacon Interval, Capability Information, Listen Interval and a Change Sequence.

Regarding inclusion of various fields in management frames: in a Beacon frame, Listen Interval is reserved; in a Probe Request frame, Beacon Interval, Capability Information, Listen Interval are reserved; in a Probe Response frame, Listen Interval is reserved; in an Association Request frame, Capability Information is frame dependent field; in an Association Response frame, Beacon Interval and Listen Interval are reserved; in a Reassociation Request frame, Beacon Interval is reserved; and in a Reassociation Response frame, Beacon Interval and Listen Interval are reserved.

Figure 6:
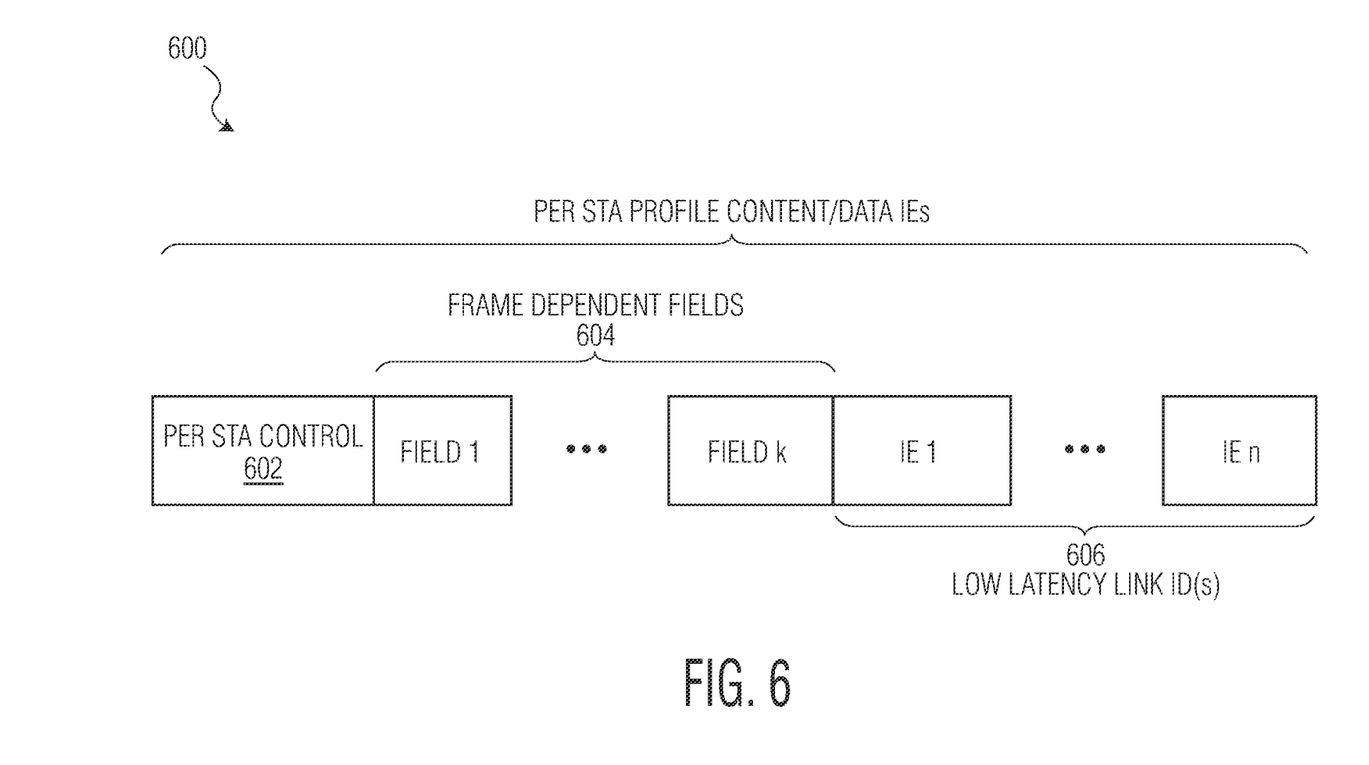
FIG. 6 represents an example set of per-STA Profile Content/Data IEs.

FIG. 6 represents another example 600 of a per-STA Profile within a set of set of ML IEs. The example 600 per-STA Profile includes a per-STA control 602, a set of management frame dependent fields 604, and a set of low latency link ID(s) 606.

Now discussed are some example rules for multi-link setup and operation.

In some example embodiments, a multi-link setup rule could require that multi-link setup between MLDs be performed separately on each of the PHY-layer links using one or more management frames. While in other example embodiments however, to reduce duplicate transmission of the ML IEs, a multi-link setup rule could require that multi-link setup between MLDs be performed on only one of the several PHY-layer links between the MLDs. Such a rule would reduce overhead.

Different types of management frames include different types of ML IEs. Some different types of management frames include: beacon frames, sounding/probe request/response frames, and association/reassociation request/response frames. These various management frames include information about each of the multiple PHY-layer links between a set of MLDs.

In some example embodiments, when the information of a MLD requires multiple ML IEs, e.g. when one ML IE can't carry the information of a MLD, all the ML IEs carry the Common Info and per-STA Profiles. In other example embodiments, the information of a MLD requires multiple ML IEs, the first ML IE carries the Common Info and per-STA-profile and the following ML IEs carry the information of per-STA Profiles only.

Management frames such as a request/response frame can be configured for information acquirement of MLD and its affiliated links before or after MLD to MLD multi-link setup and operation.

For example, when a requesting MLD requests information of reported link (a link that is not the link where the request frame is transmitted) through a reporting link (the link where the request frame is transmitted), the requesting MLD can generate a multi-link information request management frame addressed to the reporting MLD that is a Probe Request frame (or a new defined Action frame) specifying the (identifiers of a set of requested IEs for one or more reported links. In request frame, the requested IDs of the reporting link are carried in ML IE.

The responding MLD can generate a multi-link information Response frame carrying just the set of requested IEs (the elements requested by the request frame) of the reported links. In some embodiments, the request management frame and the response management frame will be carried in same link. In other embodiment, the request management frame and the response management frame will be transmitted in different links. The response frame will, in many example embodiments, always carry the requested elements in ML element even if the response frame is transmitted in the link that owns the elements.

However, in example embodiments when reported link information is not available to a requesting MLD, the requesting MLD can generate a multi-link information request management frame specifying the identifiers of a sub-set of IEs and an additional element/field that announces that reported link information is requested for one or more reported links (the requested links). and a Response frame carries the sub-set of IEs and the requested reporting link information.

Thus for multiple links between two or more MLDs, instead of reporting all information of the link being requested or all links, only a specific set of requested IEs for a particular MLD link carried in a response frame thereby reducing overhead.

Use of the additional element/field decreases the request/response overhead, and enables performing association and operation for additional links (e.g. a non-AP MLD whose link 1 and link 2 were established with AP MLD establishes link 3 with the AP MLD through Association Request/Response through link 1 or link 2).

Some example rules for indicating which link within the set of multiple-links the sub-set of IE are requested for are now discussed.

For example, when an MLD knows a link ID for a particular reported link (requested link), then the MLD's request frame is configured to carry the link ID and a per-STA-profile that carries (extended) element IDs of the sub-set of requested IEs for that particular reported link.

However when the MLD does not know the link ID for the particular reporting link, then the MLD's request frame is configured to carry a related band and a per-STA-profile for which the sub-set of IEs is requested from that particular reporting link.

Some example rules for indicating the sub-set of IEs requested are as follows.

The MLD's request frame is configured to carry the identifiers of specific IEs requested by specifying one or more information element IDs and information element ID Extensions. In some example embodiments, the information element ID, or information element ID+information element ID Extension could be carried in Requested element or Extended Request element.

When critical update (e.g. changes of BSS operational parameters, various link capabilities, HT/VHT/HE/EHT operation elements, EDCA Parameter Set, MU EDCA Parameter Set etc.) of the reported link are requested, the MLD's request frame is configured to carry the specific critical IE/field in the per link info of the reported link that carries a change sequence (i.e. a value that increases for each change of critical information). The MLD may already have this information or have acquired it from an affiliated MLD.

Some example rules for indicating the content of the response frame include: the Response frame carries the sub-set of IEs requested; the Response frame carries the critical information requested; and/or the Response frame can also carry more information more than requested (e.g. when the response frame is a broadcast frame).

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A first multi-link device (MLD) within a wireless local area network (WLAN), comprising:
    a controller configured to transmit a request frame to a second MLD;
    wherein the second MLD includes an established set of links with a third MLD;
    wherein the request frame from the first MLD includes a set of multi-link information elements (ML IEs) that request a set of information elements to be reported on at least one of the second MLD's established links with the third MLD;
    wherein the set of information elements is less than a complete set of information elements for the at least one of the links with the third MLD; and
    wherein in a response frame the second MLD reports on the requested set of information elements;
    wherein the ML IEs include a set of common IEs, wherein the set of common IEs includes a multi-link control IE, and wherein the multi-link control IE includes an MLSR multi-link single-radio) indication subelement, an ESRMR (enhanced single-radio multi-radio) indication subelement, an ESRMR MCS (Modulation and Coding Scheme) Nss number of spatial streams) Present subelement, a low latency support subelement, a low latency link ID (identifier) subelement, and a ML maximal MPDU (MAC Protocol Data Unit) length subelement.

2. The device of claim 1:
    wherein the ML IEs include the set of common IEs and a set of link IEs.

3. The device of claim 2:
    wherein the common IEs also include a set of low latency link ID(s).

4. The device of claim 2:
    wherein the link IEs include a set of per-STA-profiles.

5. The device of claim 4:
    wherein the per-STA-profiles include a set of low latency link ID(s).

6. The device of claim 1:
    wherein the ML IEs are included in a management frame, which is at least one of: a beacon frame, a probe request frame, a probe response frame, an association request frame, an association response frame, a reassociation request frame, or a reassociation response frame.

7. The device of claim 1:
    wherein the set of ML IEs generated by the controller are different for different management frame types.

8. The device of claim 1:
    wherein the second MLD is a STA (station), the first MLD is an AP (access point).

9. The device of claim 1:
    wherein both the first and second MLDs are STAs (stations).

10. A method for multi-link setup between a first Multi-Link Device (MLD) and a third Multi-Link Device (MLD), comprising:
    receiving, by a second MLD, a request frame from the first MLD for multi-link setup with the third MLD;
    wherein the request frame from the first MLD includes a set of multi-link information elements (ML IEs) that request a set of information elements to be reported on at least one of the second MLD's established links with the third MLD;
    wherein the set of information elements is less than a complete set of information elements for the at least one of the links with the third MLD;
    wherein the multi-link setup is defined by the set of ML IEs;
    and
    transmitting, by the second MLD, a response frame, that reports on the requested set of information elements,
    wherein the ML IEs include a set of common IEs, wherein the set of common IEs includes a multi-link control IE, and wherein the multi-link control IE includes an MLSR (multi-link single-radio) indication subelement, an ESRMR (enhanced single-radio multi-radio) indication subelement, an ESRMR MCS (Modulation and Coding Scheme) Nss (number of spatial streams) Present subelement, a low latency support subelement, a low latency link ID (identifier) subelement, and a ML maximal MPDU (MAC Protocol Data Unit) length subelement.

11. The method of claim 10:
    receiving a second request frame from the first MLD for multi-link setup with the third MLD on another one of the links with the third MLD; and
    transmitting, by the second MLD, a second response frame, that includes an additional set of ML IEs reporting on the another one of the links with the third MLD.

* * * * *